INVENTOR.
George A. Scherbatskoy

May 31, 1960

S. A. SCHERBATSKOY 2,939,010

DIRECTIONAL RADIATION DETECTOR

Filed Dec. 23, 1953

INVENTOR.

Sage A. Scherbatskoy

United States Patent Office 2,939,010
Patented May 31, 1960

2,939,010

DIRECTIONAL RADIATION DETECTOR

Serge A. Scherbatskoy, 804 Wright Bldg., Tulsa 3, Okla.

Filed Dec. 23, 1953, Ser. No. 399,972

3 Claims. (Cl. 250—71)

This invention deals with radiation measuring devices and has particular reference to a method and apparatus for determining the unknown direction and position of a source of nuclear radiation such as gamma rays.

Various methods and apparatus have been used in the prior art for determining the unknown position of sources, and were based essentially on the measurement of the intensity of radiation at various points in the space surrounding the source. Such methods lead, however, to very laborious measurements and computation and are not well adapted to the solution of the problem. Other methods have used a heavy lead shielding tube around the detector in order to give it some directional properties. These methods also have proved unsatisfactory because of the weight and bulk of the shielding tube.

The present invention is based on an entirely novel approach to the problem and provides a method and instrument for indicating the direction of an unknown source.

It is the object of this invention to provide an orientable detecting instrument that is adapted to be oriented in the direction of a source of gamma radiation.

It is another object of this invention to provide an instrument and method for determining direction and position of an unknown source of gamma radiation.

It is another object of this invention to provide a new method and instrument for locating tumors in the brain and other parts of the human body for diagnostic purposes.

It is another object of this invention to receive selectively hard gamma radiation that arrives at the detector and to eliminate from the reception soft gamma radiation.

It is another object of this invention to combine directional selectivity with the selectivity to hard gamma radiation.

Other objects of the present invention will be apparent from the description which follows when taken in connection with the drawing in which.

Figure 1A:
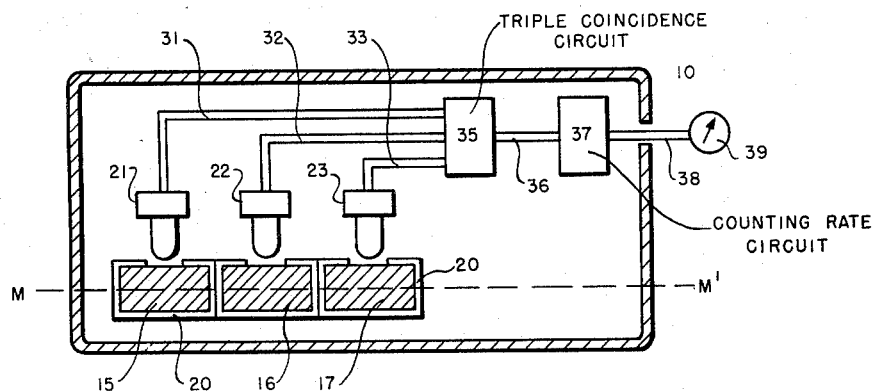
Fig. 1A shows a directional detector comprising three adjacent detecting elements aligned along a reference axis.

Referring now to Fig. 1A, the directional gamma ray detector shown therein is enclosed within a suitable container 10 and comprises as its essential elements three crystals 15, 16, 17 made of naphthalene, anthracene, sodium iodide, or any other suitable substance adapted to "scintillate," i.e. to produce a flash of light due to the excitation and ionization produced by the passage of a charged particle. The crystals 15, 16, 17 are aligned along a direction M—M¹ which we shall designate as "the axis of the directional detector" and each of these crystals has its outside surface covered with an aluminum reflector 20. The light flashes produced in the crystal 15 are adapted to be transmitted by means of the reflector 20 to a photomultiplier provided with a voltage supply, the combined photomultiplier and voltage supply being designated as 21. Similarly, the light flashes produced in the crystals 16 and 17 are adapted to be transmitted by means of the reflectors 20 to photomultipliers 22 and 23, respectively. Each of the photomultipliers is adapted to produce across its output terminals a current pulse in response to a flash of light in the corresponding crystal.

The outputs of the photomultipliers 21, 22, 23 are applied by means of leads 31, 32, 33, respectively, to a triple coincidence circuit 35. The coincidence circuit is adapted to produce across its output leads 36 an electric pulse whenever the pulses produced in the outputs of the photomultipliers 21, 22, and 23 occur in coincidence. Coincidence circuits are well known in the art and for their description see, for instance, E. Segre "Experimental Nuclear Physics," John Wiley & Sons, New York, N.Y. 1953, pp. 104–108.

The output leads of the coincidence circuit 35 are applied to a counting rate circuit 37. The counting rate circuit is of a standard construction and is adapted to produce across its output terminals 38 a D.C. voltage, the magnitude of which represents the frequency of impulses produced in the output leads of the coincidence circuit 35. The leads 38 are in turn connected to an indicator 39 indicating said output voltage.

Figure 1B:
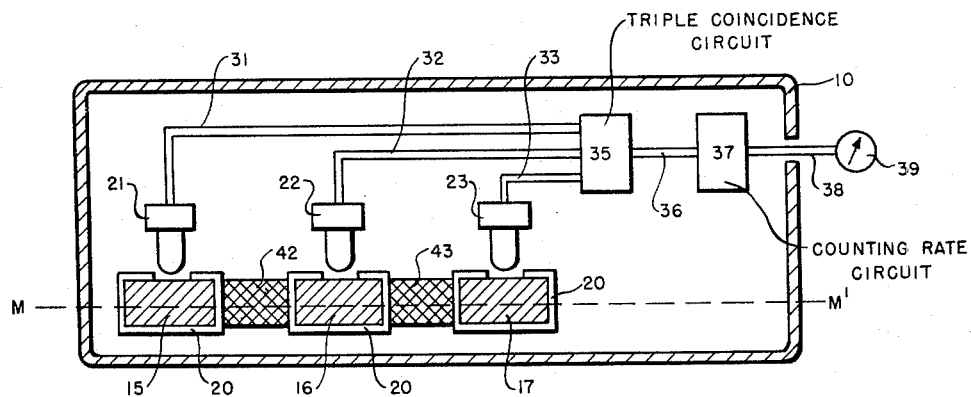
Fig. 1B shows a directional detector comprising three detecting elements aligned along a reference axis, said elements being separated one from the other by means of tungsten shields.

Fig. 1B shows a modification of the arrangement of Fig. 1A in which the elements common to both figures are designated by the same numerals. It is noted that in Fig. 1B the crystals 15 and 16 are separated one from the other by a tungsten shield element 42 and the crystals 16 and 17 are separated by a tunsgten shield element 43.

Figure 1C:
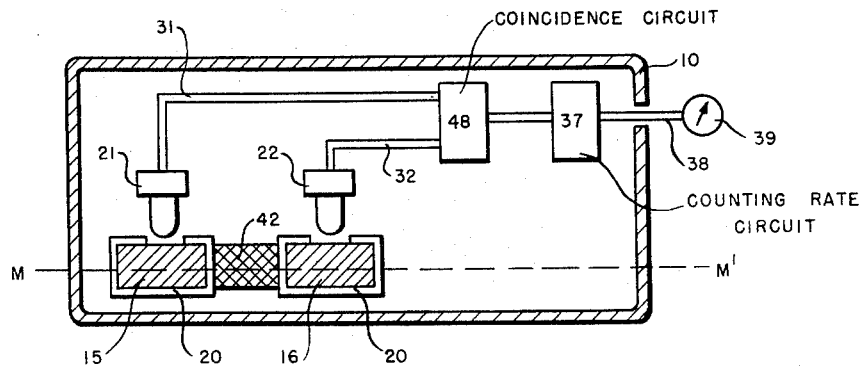
Fig. 1C shows a directional detector comprising two detecting elements aligned along a reference axis.

Fig. 1C shows a modification of the arrangement of Fig. 1B that comprises only two crystals 15, 16 separated by the tungsten shield 42. The corresponding photomultipliers 21, 22 have their outputs connected to a double coincidence circuit 44. The output of the coincidence circuit 44 is connected to the counting rate circuit 37 and the output of said latter circuit is indicated on a meter 39.

We shall consider now the interaction of the incoming gamma radiation with crystals such as 15, 16, and 17. It is well known that gamma rays interact with matter in three different ways: by photoelectric effect, Compton effect, and pair formation. We shall consider here the first two types of interaction.

In the photoelectric effect which is characteristic of low energy photons, the incoming photon ejects an orbital electron from the atom of the crystal. The photon disappears in this process and the electron slows down in the crystal producing a pulse of light which in turn produces a current impulse in the output of the photomultiplier. Since the photon has entirely disappeared in the crystal, no further effects are produced in any of the adjoining crystals shown in Figs. 1A, 1B, and 1C. Consequently, a photoelectric absorption is characterized by an occurrence of a pulse in one of the photomultipliers while the adjoining photomultipliers produce no pulse. Consequently, the photoelectric effect is not recorded, neither by the triple coincidence circuit 35 of Fig. 1A and Fig. 1B, nor by the double coincidence circuit 44 of Fig. 1C.

In the Compton effect the incoming photon is scattered by one of the electrons in the crystal. As a result of such scattering the electron has acquired kinetic energy, thus producing a pulse of light in the crystal, said light producing in turn a current impulse in the output of the photomultiplier associated with said crystal. The scattered photon usually escapes from the crystal and sometimes interacts with adjoining crystals, thus producing one or two coincident light pulses in said adjoining crystals. We shall investigate now when such an additional interaction does take or does not take place.

Figure 2:
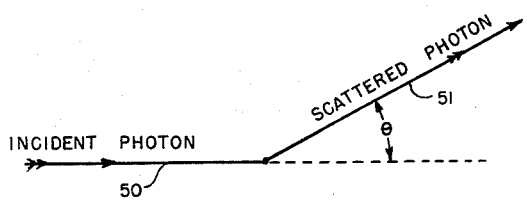
Fig. 2 illustrates certain angular relationships occurring during Compton scattering.

It is well known that as a result of Compton scattering the incoming gamma ray is usually deflected from its original course as a result of a collision with an electron. Such a deflection is shown in Fig. 2 in which 50 designates the photon trajectory before the collision, 51 designates its trajectory after the collision and $\theta$ is the angle of scattering which shows the deviation of the direction of the scattered photons from the direction of the incoming photons. The energy of the scattered photon is smaller than the energy of the incoming photon and depends upon the angle of scattering $\theta$, i.e. the larger is the scattering angle, the smaller is the energy of the scattered photon. This relationship is shown diagrammatically in Fig. 3 in which curve 1 corresponds to an incident photon energy of 0.5 Mev. and curves 2 and 3 correspond to incident photon energies of 1.5 Mev. and 2.5 Mev., respectively. The abscissas represent the angles of the scattered photons and the ordinates are the energies of the corresponding scattered photon. It is seen that if the incident photon has relatively low energy (curve 1) the energy of the scattered photon decreases very slowly when the angle of scattering is increased. However, for incident photons of a relatively high energy such as 2.5 Mev. (curve 3) the energy of the scattered photons decrease rapidly when the angle of scattering is increased.

Figure 4:
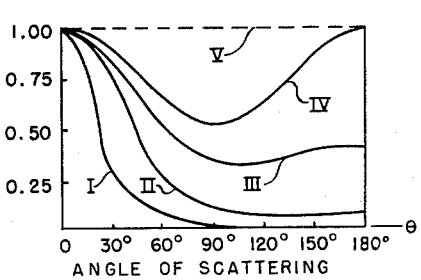
Fig. 4 shows angular intensity distribution of the scattered photons.
Figure 3:
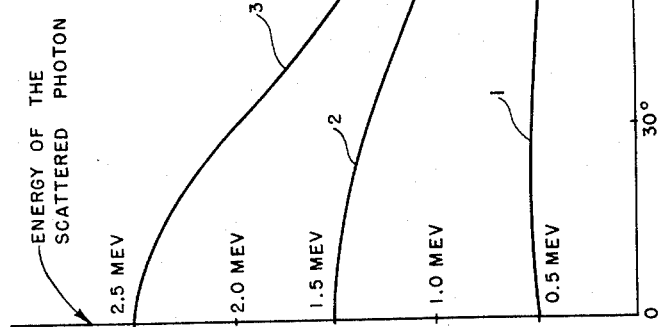
Fig. 3 shows energies of a scattered photon for various angles of scattering.

Fig. 3 does not describe fully Compton scattering since it shows merely how the energy of each individual scattered photon depends upon the angle of scattering and does not show the number of photons scattered into various angles. We need therefore an additional diagram such as shown in Fig. 4 showing the angular distribution of the intensity (i.e. number 2) of scattered photons. Curve I shows the angular distribution of the intensity of scattered photons when the initial photon energy is 2.5 Mev. Curves II and III show corresponding distribution for the initial photon energies of 0.5 Mev. and 0.08 Mev., respectively, and curve IV corresponds to very soft X-rays. The abscissas represent the angle of scattering $\theta$; $I_0$ is the total incident flux and $I(\theta) \, d\Omega$ is the portion of flux that was scattered at an angle $\theta$ and is comprised within an elementary solid angle $d\Omega$. Consequently, the ordinates corresponding to the value $I(\theta)/I_0$ represent the distribution in intensity of the scattered flux for various values of $\theta$. For further reference to this distribution see Heitler's "The Quantum Theory of Radiation," second edition, Oxford University Press, pp. 146–160 and particularly to Fig. 12, page 156.

When considering the angular distribution of scattered photons, we differentiate between "isotropic scattering" and "anisotropic scattering." In isotropic scattering, the intensity of the scattered radiation would be uniformly distributed in all directions and such a distribution would be represented by a horizontal line V. It is apparent from the curves I, II and III of Fig. 4 that the distribution of the scattered photons is not isotropic and tends to be concentrated at small values of the angle of scattering $\theta$. Thus the photons are scattered in the forward direction and thus tendency for scattering forward becomes much more pronounced for incident photons of high energy. Thus curve IV showing the distribution for incoming photons of relatively small energy is not very different from the isotropic distribution represented by the curve V. We see, however, that for an incident photon energy of 0.5 Mev. (curve II), the scattering distribution is concentrated in the region of small values of $\theta$ (forward direction) and it becomes much more concentrated in the forward direction for incident photons of higher energies as shown by means of curve I (for 2.5 Mev.).

We shall utilize the above properties of Compton scattering to provide a radiation detection having the following two characteristics: (a) directional selectivity, and (b) energy selectivity. Because of its directional selectivity, the detector is adapted to respond primarily to radiations arriving from a predetermined direction and thus it can be used to determine the direction of an unknown source and for triangulation purposes to determine its position of an unknown source. Because of its energy selectivity, the detector is adapted to respond primarily to photons of large energy and is not responsive to soft photons. It is well known that the photons of low energy that arrive at the detector originate at the small distances in the immediate neighborhood of the detector while the photons of large energy that arrive at the detector have a considerably greater penetrating power and originate within large distances from the detector. Thus, because of its energy selectivity, the detector will be selectively responsive to radiation sources that may be located at considerable distances from the detector.

Figure 5:
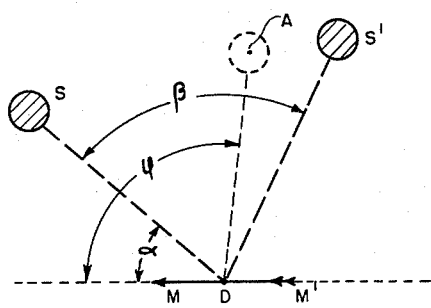
Fig. 5 shows a geometrical relationship between the direction of the detector axis and the direction of various sources in the surroundings.

Consider now Fig. 5 showing the detector of the type illustrated in Fig. 1A positioned in the neighborhood of the point D, and having its axis aligned along the direction $MM^1$. Assume that the detector is submerged in a medium containing a distributed source of soft gamma rays and that a relatively large distance from the detector is located an unknown source S radiating gamma rays of relatively high energy. Let $\alpha$ designate the angle between the direction of the source S and the axis $MM^1$ of the detector. We shall show how the response of the detector will vary with the orientation of its axis, i.e. with the angle $\alpha$. Assume also that another unknown source $S^1$ identical to the source S is located at a large distance from the detector and let $\beta$ be the angle between the direction DS and $DS^1$.

Figure 6:
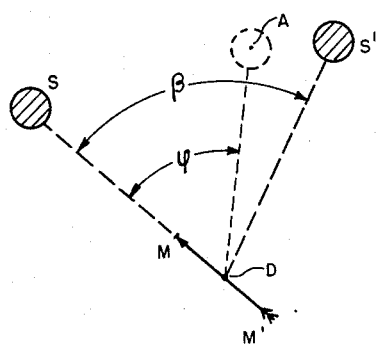
Fig. 6 shows another geometrical relationship between the direction of the detector axis and the direction of various sources in the surroundings.

Assume that the axis of the detector $MM^1$ is oriented in the direction of the source S as shown in Fig. 6. Then the gamma rays radiated by the source S arrive at the detector and interact with the crystal 15. Since the energy of the gamma rays is relatively high, we have here the case of Compton scattering illustrated by curve I of Fig. 4 according to which the scattered photons are concentrated in the forward direction. We may thus assume all the scattered photons went into the crystal 16 and a great portion of them undergoes a second scattering in the crystal 16. By referring now to curve 3 of Fig. 3, we see that the photons that have been scattered by the crystal 15 have a relatively high energy (since $\theta$ is small). Consequently, these photons undergo again a forward scattering by the crystal 16 into the crystal 17 and a great portion of these photons interact with the crystal 17, said last interaction being of the type of Compton scattering or photoelectric effect. It is well known that each interaction of a photon with a crystal knocks out an electron which in turn produces a flash of light in a manner well known in the art and causes an electric impulse to appear in the output of the corresponding photomultiplier. In this particular case a gamma ray arriving from the detector from the source S causes three successive interactions in the crystals 15, 16, and 17. These are almost simultaneous and therefore three impulses appear in the outputs of the photomultipliers 21, 22, and 23. These impulses arrive in coincidence and therefore actuate the coincidence circuit 35. Thus a gamma ray arriving from the source S actuates the coincidence circuit and causes an impulse to appear across the output leads 36.

Consider now a photon radiated by the source $S^1$. This photon may interact with either of the crystals 15, 16, or 17. Since the incident photon has a high energy, we know from curve I of Fig. 4 that the scattered photon is projected forward in the same direction as the incident photon, i.e. in the direction $S^1D$. Such a scattered photon produced in either of crystals 15, 16, 17 escapes and does not interact with any of the adjoining crystals. In such case we obtain a single light pulse in the crystal in which the interaction took place, and a current impulse in the corresponding photomultiplier. Since there are no coincident impulses in the outputs of the adjoining photomultipliers, the coincidence circuit 35 remains inactive. Thus a gamma ray arriving from the source $S^1$ does not actuate the coincidence circuit and causes no impulse across the output leads 36.

Consider now the effect of the source that is continuously distributed throughout the medium surrounding the detector. Let the density of the distribution be such that the amount of radioactive substance contained in cm.³ of the medium is small compared to the amount of the substance contained either in the sources S or $S^1$, but let the total amount of the radioactive substance uniformly distributed in said medium be considerably larger than the corresponding amounts contained in the sources S or $S^1$. Assume also that the substance continuously distributed in said medium emits hard and soft gamma radiation.

Thus in addition to gamma rays emitted by the sources S and $S^1$, the detector receives from all directions soft and hard gamma rays radiated by the continuously distributed sources, and the total amount of radiation received from the continuously distributed sources exceeds the radiation from sources S and $S^1$. It is apparent that a soft gamma ray interacts only with one of the crystals and the interaction is due to photoelectric effect. Consequently, for the reasons explained above, no coincidence pulses are produced. Therefore, the detector is insensitive to soft radiations.

Consider the hard radiations emitted from all directions by the surrounding medium. We shall determine first the effect of gamma rays radiated from a small volume of the medium enclosed in a small sphere surrounding the point A. The point A may be located anywhere in the space surrounding the detector. The gamma rays radiated by such a small sphere arrive at the detector at an angle $\varphi$, and said angle $\varphi$ may have any value from 0° to 180°, depending upon the position of the point A. Consider now the effects of the scattering of these gamma rays by the crystal 15. Since the incident gamma rays have relatively large energies, the scattering is predominantly forward in accordance with curve I of Fig. 4. However, not all gamma rays are scattered forward and escape from the crystals. A relatively small portion of the incident flux is scattered at an angle $180°-\varphi$ into the crystal 16. These scattered photons may interact with the crystal 16. In such case we shall have two Compton interactions in a very rapid succession: the first produced by the incident photon in the crystal 15 and the second produced by the scattered photon in the crystal 16. We obtain, therefore, two coincident pulses in the outputs of the photomultipliers 21 and 22.

We have considered the fact that because of the shape of curve I of Fig. 4 the number of photons that arrived from the small sphere surrounding A and that have been scattered by the crystal 15 into the crystal 16 is relatively small, and therefore the number of coincident impulses at the outputs of the photomultipliers 21 and 22 is relatively small. If, however, we consider the effect not only of a small sphere in the medium but of the whole medium, it can be readily seen that the total number of photons that have been scattered by the crystal 15 into the crystal 16 is relatively large and, therefore, the number of double coincidences due to pulses at the photomultipliers 21 and 22 is large. We shall refer, however, now to curve 3 of Fig. 3 which shows that for an incident photon of high energy the scattered photon has very small energy if the angle of scattering is large. It is apparent that the photons that have been scattered by the crystal 15 into the crystal 16 have been deviated considerably from their original direction, i.e. the scattering angle was large. Consequently, the photons have small energies and when they interact with the crystal 16 they undergo a second scattering that is characterized by the curve IV of Fig. 4. Referring now more particularly to this curve, it is seen that for incident photons of small energy the scattering is more nearly isotropic, i.e. the scattered photon may be emitted in any direction, not necessarily forward. Consequently, the scattered photon that interacts with the crystal 16 may be scattered again, but not in the forward direction and thus may escape without producing any further interaction with the crystal 17. Since a further interaction with the crystal 17 is unlikely, we shall not obtain any pulse in the photomultiplier 23. Consequently, there is no occurrence of a triple coincidence, and the detector will not be responsive to the radiation emitted by the surrounding medium.

It is thus apparent that when the axis of the detector is directed towards the source S as shown in Fig. 6, the detector will be responsive only to the radiations emitted by S, i.e. it will be irresponsive to radiations emitted by the source $S^1$ and by the surrounding medium. Thus each pulse across the output leads 36 of the coincidence circuit will correspond to a gamma ray radiated by the source S. Consequently, the rate of arrival of such pulses determined by the output of the counting rate circuit 37 will represent the strength of the source S. Thus I have provided by means of the indicator 39 an index representing the strength of the source S.

If we rotate the detector by a small angle its response as shown by the meter 39 will decrease substantially to zero. However, when the axis of the detector becomes oriented towards the source $S^1$, the meter 39 will show the strength of radiation emitted by the source $S^1$ and will be still insensitive to any other radiations.

Figure 7:
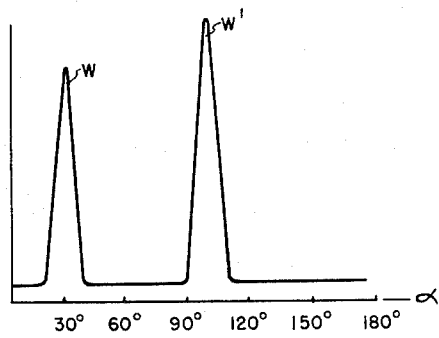
Fig. 7 shows the output of the directional detector for various orientations of its axis.

The present invention may be applied to those cases in which the location of a concentrated radiation source is unknown and it is desired to find the direction along which the source is located. The procedure consists in rotating the axis $MM^1$ of the directional counter until the indication of the meter 39 reaches the maximum value. The axis $MM^1$ will point then towards the source. A curve showing the variation in the output of the meter 39 with the rotation of the axis $MM^1$ is shown in Fig. 7. The peaks W and $W^1$ correspond to the angular position $\alpha$ and $\alpha+\beta$ of sources S and $S^1$, respectively (with respect to a reference direction shown in Fig. 5).

It is apparent that the above description relates to the radiation detector shown in Fig. 1A or to the one of Fig. 1B. The presence of tungsten in Fig 1B makes the directional counter more selective to hard gamma rays. The selectivity to hard gamma rays may also be increased by using four or more crystals arranged along the direction $MM^1$ and using a quadruple or quintuple coincidence circuit in place of the triple coincidence circuit 35.

It is also apparent that a counter comprising only two crystals such as 15, 16 aligned along the direction $MM^1$ can be used for the directional reception of gamma rays. When such detector as shown in Fig. 1C is directed towards the radiation source as shown in Fig. 6, the gamma rays arriving from the source S will be scattered by the crystal 15 into the crystal 16 and thus produce double coincidences, the frequency of said coincidences being indicated by the meter 39. The gamma rays that arrive from the source $S^1$ will be scattered by the crystal (either crystal 15 or 16) in the forward direction, and therefore will escape from the crystal and produce only a single pulse. The influence of radiations uniformly distributed in the surrounding medium will depend upon the spectral composition of these radiations. If these radiations are soft, they produce photoelectric interaction either in the crystal 15 or in the crystal 16. We obtain thus single pulses without occurrence of coincidence, and therefore the detector remains insensitive to such radiation. If the gamma rays emitted by the medium are very energetic, then the scattering is predominantly forward. The detector will be insensitive to those radiations for the same reasons that it is insensitive to radiations from the source $S^1$ when the axis $MM^1$ is directed as shown in Fig. 5.

It is thus apparent that a detector such as shown in Fig. 1C responds to radiation sources such as S or $S^1$ only when its axis $MM^1$ is directed towards either of these sources. Furthermore, it has a relatively small response to the radiations emitted by the surrounding medium since it does not respond to those radiations emitted by said medium that are either very soft or very hard.

Figure 8:
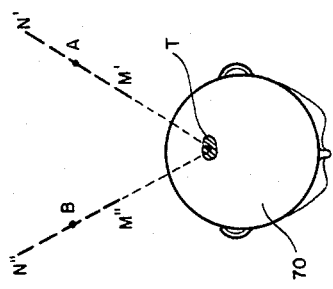
Fig. 8 shows how the directional counter may be used for the location of brain tumors.

Fig. 8 shows an application of my invention for diagnostic purposes in medicine. It has been recently proposed to locate brain tumors by injection into the blood stream of a radioactive substance such as $I^{131}$-enriched diiodofluorescein. This substance is selectively absorbed by the diseased tissue and therefore after the injection the tumor becomes a source of radiation. The problem of locating the tumor becomes therefore identical with the location of a radiation source and can be solved by applying the principles of this invention. In Fig. 10, 70 indicates a human head and T the position of a tumor. The directional detector of Fig. 1 or of Fig. 7 is placed initially at the loaction A and rotated until its axis MS becomes aligned along the direction $N^1N^1$. Subsequently we place the detector at the location B and rotate its axis MN until it becomes aligned along the direction $M^{11}N^{11}$. It is apparent that the intersection of the axis $M^1N^1$ with the axis $M^{11}N^{11}$ provides the position of the tumor T.

I claim:

1. A directional radiation detector characterized by selective response to hard gamma rays comprising a plurality of scintillating crystals, at least three in number, said crystals being mounted in alignment along a reference direction and spaced apart one from another, whereby a photon scattered in one of said crystals will produce no interactions in the others of said crystals unless its direction of arrival is along said reference direction and its scattering angle is small, each of said scintillating crystals being of the type which produces a flash of light responsively to interaction of a gamma ray therewith, a photomultiplier tube for each of said scintillating crystals, said photomultipliers being operative to produce current impulses responsively to light flashes in the respective crystals therewith associated, a coincidence circuit connected to said photomultipliers for producing an output pulse whenever current impulses produced by said photomultipliers occur in substantial time coincidence, a counting-rate circuit connected to said coincidence circuit for producing a voltage representing the rate of occurrence of said output pulses, and means for indicating said voltage.

2. Apparatus according to claim 1 wherein a radiation-absorbing shield is interposed sandwich-fashion between each pair of said crystals along said reference direction, whereby substantially coincident flashes in said plurality of crystals occur only in response to gamma rays of very high energy arriving along said reference direction.

3. A radiation detector characterized by selective directional response to hard gamma rays comprising a plurality of scintillating crystals mounted in alignment along a reference direction and spaced apart one from another, a radiation-absorbing shield interposed sandwich-fashion between an adjacent pair of said crystals along said reference direction, a photomultiplier tube for each of said crystals, said photomultipliers being operative to produce current impulses responsively to light flashes in the respective crystals therewith associated, a coincidence circuit connected to said photomultipliers for producing an output pulse whenever current impulses produced by said photomultipliers occur in substantial time coincidence, a counting-rate circuit fed by said coincidence circuit for producing a voltage representing the rate of occurrence of said output pulses, and means for indicating said voltage, said apparatus being unresponsive to all radiation impinging on it save high-energy gamma rays arriving along said reference direction.

References Cited in the file of this patent
UNITED STATES PATENTS

| | | |
|---|---|---|
| 2,648,012 | Scherbatskoy | Aug. 5, 1953 |
| 2,711,482 | Goodman | June 21, 1955 |

OTHER REFERENCES

Korff: Electron and Nuclear Counters, Theory and Use, New York, (D. Van Nostrand Company, Inc.) 1946, pages 163 to 171.

Brown: Foundations of Modern Physics, New York, (John Wiley and Sons, Inc) 1949, page 350.

"Two Crystal Gamma-Ray Scintillation Spectrometer," by R. E. Connally, from the Review of Scientific Instruments, vol. 24, No. 6, June 1953, pages 458 and 459.